United States Patent
Milne et al.

(10) Patent No.: US 10,127,601 B2
(45) Date of Patent: Nov. 13, 2018

(54) MESH NETWORK APPLIED TO FIXED ESTABLISHMENT WITH MOVABLE ITEMS THEREIN

(71) Applicant: SONY CORPORATION, Tokyo (JP)

(72) Inventors: James R. Milne, Ramona, CA (US); Gregory Peter Carlsson, Santee, CA (US); Frederick J. Zustak, Poway, CA (US)

(73) Assignee: Sony Corporation, Tokyo (JP)

(*) Notice: Subject to any disclaimer, the term of this patent is extended or adjusted under 35 U.S.C. 154(b) by 27 days.

(21) Appl. No.: 14/332,836

(22) Filed: Jul. 16, 2014

(65) Prior Publication Data
US 2016/0019515 A1 Jan. 21, 2016

(51) Int. Cl.
  *G06Q 30/06* (2012.01)
  *H04W 4/04* (2009.01)
  *H04W 84/18* (2009.01)
  *G06Q 20/20* (2012.01)

(52) U.S. Cl.
  CPC ..... *G06Q 30/0635* (2013.01); *G06Q 30/0639* (2013.01); *G06Q 30/0641* (2013.01); *H04W 4/043* (2013.01); *G06Q 20/201* (2013.01); *H04W 84/18* (2013.01)

(58) Field of Classification Search
  CPC combination set(s) only.
  See application file for complete search history.

(56) References Cited

U.S. PATENT DOCUMENTS

| | | |
|---|---|---|
| 3,985,357 A | 10/1976 | Miller |
| 4,123,511 A | 10/1978 | Heintze |
| 4,301,207 A | 11/1981 | Schomerus |
| 4,340,053 A | 7/1982 | Sarui |
| 4,463,949 A | 8/1984 | McCoy, Sr. et al. |
| 4,625,336 A | 12/1986 | Derderian |
| 4,962,935 A | 10/1990 | Williams |
| 4,992,003 A | 2/1991 | Perach |
| 5,154,266 A | 10/1992 | Bieber et al. |
| 5,201,075 A | 4/1993 | Svetich |
| 5,219,316 A | 6/1993 | Huffman |
| 5,413,328 A | 5/1995 | Glancey et al. |

(Continued)

FOREIGN PATENT DOCUMENTS

| | | |
|---|---|---|
| CN | 101783931 A | 7/2010 |
| CN | 101978370 A | 2/2011 |

(Continued)

OTHER PUBLICATIONS

Arzoo Dahiya, Dr. R.K. Chauhan, "A Comparative Study of MANET and VANET Environment" Journal of Computing, vol. 2, Issue 7, Jul. 2010, ISSN 2151-9617. http://sites.google.com/site/JournalofComputing/.

(Continued)

*Primary Examiner* — Luna Champagne
(74) *Attorney, Agent, or Firm* — John L. Rogitz

(57) ABSTRACT

Mesh node modules are associated with movable and fixed items in a building such as a grocery store or factory floor to maintain a database of the locations of those items as they are processed through the establishment. The items form a mesh network and relay location information through access points, when in range, to control/monitoring computers.

16 Claims, 4 Drawing Sheets

(56) References Cited

U.S. PATENT DOCUMENTS

| | | |
|---|---|---|
| 5,639,243 A | 6/1997 | Ryan et al. |
| 5,742,521 A | 4/1998 | Ellenby et al. |
| 5,755,405 A | 5/1998 | Socha et al. |
| 5,927,233 A | 7/1999 | Mainini et al. |
| 6,401,250 B1 | 6/2002 | McNabb |
| 6,438,755 B1 | 8/2002 | MacDonald et al. |
| 6,588,840 B1 | 7/2003 | Lombardo |
| 6,742,636 B2 | 6/2004 | Godshaw |
| 6,810,831 B1 | 11/2004 | Opfel |
| 6,816,460 B1 | 11/2004 | Ahmed et al. |
| 6,910,447 B1 | 6/2005 | Azarian |
| 6,946,817 B2 | 9/2005 | Fischer et al. |
| 7,323,981 B2 | 1/2008 | Peel et al. |
| 7,328,671 B2 | 2/2008 | Kates |
| 7,416,123 B2 | 8/2008 | Saperstein et al. |
| 7,438,356 B2 | 10/2008 | Howman et al. |
| 7,451,927 B2 | 11/2008 | Saperstein et al. |
| 7,626,966 B1 | 12/2009 | Ruiter et al. |
| 7,714,708 B2 | 5/2010 | Brackmann et al. |
| 7,753,826 B1 | 7/2010 | Oliver et al. |
| 7,768,150 B2 | 8/2010 | Platania et al. |
| 7,770,539 B1 | 8/2010 | Zimmerman et al. |
| 7,818,820 B2 | 10/2010 | Tsujimoto |
| 7,916,025 B2 | 3/2011 | Locker et al. |
| 7,962,186 B2 | 6/2011 | Cui et al. |
| 8,126,782 B1 | 2/2012 | Zhu et al. |
| 8,149,748 B2 | 4/2012 | Bata et al. |
| 8,233,846 B2 | 7/2012 | Rofougaran |
| 8,253,557 B2 | 8/2012 | Ani et al. |
| 8,366,570 B1 | 2/2013 | DeMarco et al. |
| 8,526,970 B2 | 9/2013 | Wala et al. |
| 8,568,191 B2 | 10/2013 | Rehkemper et al. |
| 8,583,182 B2 | 11/2013 | Piirainen et al. |
| 8,609,454 B2 | 12/2013 | Dai et al. |
| 8,624,743 B2 | 1/2014 | Langer et al. |
| 8,719,001 B1 | 5/2014 | Izdepski et al. |
| 8,878,671 B2 | 11/2014 | Buchheim et al. |
| 9,167,905 B2 | 10/2015 | Pajic |
| 9,310,205 B2 | 4/2016 | Xu et al. |
| 9,577,463 B2 | 2/2017 | McCoy et al. |
| 9,654,179 B2 | 5/2017 | Shultz et al. |
| 2004/0125493 A1 | 7/2004 | Shimotono et al. |
| 2004/0141635 A1 | 7/2004 | Liang et al. |
| 2004/0167367 A1 | 8/2004 | Beierle |
| 2005/0034083 A1 | 2/2005 | Jaeger |
| 2005/0127868 A1 | 6/2005 | Calhoon et al. |
| 2005/0259033 A1 | 11/2005 | Levine |
| 2005/0284405 A1 | 12/2005 | Pomakoy-Poole et al. |
| 2006/0063540 A1 | 3/2006 | Beuck |
| 2006/0080072 A1 | 4/2006 | Lachman et al. |
| 2006/0154642 A1 | 7/2006 | Scannell, Jr. |
| 2006/0224300 A1 | 10/2006 | Shioya et al. |
| 2006/0242901 A1 | 11/2006 | Casimaty et al. |
| 2007/0069687 A1 | 3/2007 | Suzuki |
| 2007/0130893 A1 | 6/2007 | Davies |
| 2007/0138272 A1 | 6/2007 | Saperstein et al. |
| 2007/0138273 A1 | 6/2007 | Saperstein et al. |
| 2007/0152479 A1 | 7/2007 | Howman et al. |
| 2007/0243296 A1 | 10/2007 | Bourassa et al. |
| 2008/0036610 A1 | 2/2008 | Hokuf et al. |
| 2008/0120768 A1 | 5/2008 | Tsujimoto |
| 2008/0173257 A1 | 7/2008 | Steiner et al. |
| 2008/0189170 A1* | 8/2008 | Ramachandra .... G06Q 30/0201 |
| | | 705/7.29 |
| 2008/0211641 A1 | 9/2008 | Murray et al. |
| 2008/0229704 A1 | 9/2008 | Augustyniak et al. |
| 2008/0237339 A1* | 10/2008 | Stawar ................. B62B 3/1408 |
| | | 235/383 |
| 2009/0040048 A1 | 2/2009 | Locker et al. |
| 2009/0118869 A1 | 5/2009 | Cauchy et al. |
| 2009/0203367 A1 | 8/2009 | Pamminger et al. |
| 2010/0020169 A1 | 1/2010 | Jang et al. |
| 2010/0119755 A1 | 5/2010 | Chung et al. |
| 2010/0123778 A1 | 5/2010 | Hada |
| 2010/0152545 A1 | 6/2010 | Ramsay et al. |
| 2010/0295687 A1 | 11/2010 | Kuzniar et al. |
| 2011/0005466 A1 | 1/2011 | Furth |
| 2011/0031928 A1 | 2/2011 | Soar |
| 2011/0068906 A1* | 3/2011 | Shafer .................. G06K 7/0008 |
| | | 340/10.3 |
| 2011/0068922 A1* | 3/2011 | Ross .................... G06Q 10/087 |
| | | 340/572.1 |
| 2011/0105099 A1 | 5/2011 | Roll |
| 2011/0156640 A1 | 6/2011 | Moshfeghi |
| 2011/0178863 A1* | 7/2011 | Daigle ............... G06Q 30/0231 |
| | | 705/14.31 |
| 2011/0270712 A1* | 11/2011 | Wood ...................... G01C 21/20 |
| | | 705/27.1 |
| 2012/0069051 A1 | 3/2012 | Hagbi et al. |
| 2012/0099800 A1 | 4/2012 | Llano et al. |
| 2012/0158297 A1* | 6/2012 | Kim ...................... G01C 21/206 |
| | | 701/516 |
| 2012/0184200 A1 | 7/2012 | Chutorash et al. |
| 2012/0303939 A1 | 11/2012 | Cain et al. |
| 2012/0319487 A1 | 12/2012 | Shah |
| 2013/0015705 A1 | 1/2013 | Abe |
| 2013/0027561 A1* | 1/2013 | Lee ........................ G06Q 30/02 |
| | | 348/150 |
| 2013/0056929 A1 | 3/2013 | Rehkemper et al. |
| 2013/0063304 A1 | 3/2013 | Almohsen |
| 2013/0068942 A1 | 3/2013 | Verenchikov |
| 2013/0093220 A1 | 4/2013 | Pajic |
| 2013/0132434 A1 | 5/2013 | Scofield et al. |
| 2013/0134923 A1 | 5/2013 | Smith et al. |
| 2013/0141251 A1 | 6/2013 | Sims et al. |
| 2013/0279409 A1 | 10/2013 | Dublin et al. |
| 2013/0292976 A1 | 11/2013 | Kane |
| 2013/0325940 A1 | 12/2013 | Foti |
| 2014/0023060 A1 | 1/2014 | Apte et al. |
| 2014/0025805 A1 | 1/2014 | Apte et al. |
| 2014/0046802 A1 | 2/2014 | Hosein et al. |
| 2014/0058866 A1* | 2/2014 | Okadome ............ G06Q 20/202 |
| | | 705/21 |
| 2014/0104046 A1 | 4/2014 | Howell |
| 2014/0117921 A1 | 5/2014 | Suomela |
| 2014/0118635 A1 | 5/2014 | Yang |
| 2014/0148095 A1 | 5/2014 | Smith et al. |
| 2014/0173439 A1 | 6/2014 | Gutierrez et al. |
| 2014/0179463 A1 | 6/2014 | Giles et al. |
| 2014/0236653 A1* | 8/2014 | Farrell ................. G07G 1/0036 |
| | | 705/7.15 |
| 2015/0039458 A1* | 2/2015 | Reid .................... G06K 9/00335 |
| | | 705/26.1 |
| 2015/0194814 A1 | 7/2015 | Taylor et al. |
| 2015/0348413 A1 | 12/2015 | Han et al. |
| 2015/0349537 A1 | 12/2015 | Milne et al. |
| 2015/0349572 A1 | 12/2015 | McCoy et al. |
| 2015/0382144 A1 | 12/2015 | Lopez |
| 2016/0019515 A1 | 1/2016 | Milne et al. |
| 2016/0019788 A1 | 1/2016 | Milne et al. |
| 2016/0021491 A1 | 1/2016 | Milne et al. |
| 2016/0021492 A1 | 1/2016 | Carlsson et al. |
| 2016/0021493 A1 | 1/2016 | Milne et al. |
| 2016/0021510 A1 | 1/2016 | Milne et al. |
| 2016/0048861 A1 | 2/2016 | Morgaine |
| 2016/0049993 A1 | 2/2016 | McCoy et al. |
| 2016/0233727 A1 | 8/2016 | Ollikainen et al. |
| 2017/0063431 A1 | 3/2017 | Milne et al. |

FOREIGN PATENT DOCUMENTS

| | | |
|---|---|---|
| CN | 101911668 B | 11/2014 |
| JP | 2004233269 | 8/2004 |
| JP | 2005017465 | 1/2005 |
| JP | 2006279859 | 10/2006 |
| JP | 2013168883 | 8/2013 |
| KR | 20140030707 A | 3/2014 |
| TW | 200845889 | 12/2008 |
| TW | 201221051 | 6/2012 |
| WO | 2009051449 A3 | 7/2009 |
| WO | 2009130199 A1 | 10/2009 |
| WO | 2010078616 A1 | 7/2010 |
| WO | 2013105920 A2 | 7/2013 |

(56) References Cited

FOREIGN PATENT DOCUMENTS

OTHER PUBLICATIONS

Yousaf Saeed, Suleman Aziz Lodhi, Khalil Ahmed, "Obstacle Management in VANET using Game Theory and Fuzzy Logic Control", ACEEE Int. J. on Communications, vol. 4, No. 1, Jul. 2013.
The Seventh ACM International Workshop on Vehicular Inter-NETworking (VANET 2010) in conjunction with ACM MobiCom 2010. Sep. 24, 2010.
Tao Zhang, Xian Chen, Russell Hsing, K. Dnaiel Wong,"VNTA sub-TC" IEEE Communications Society, printed from web Jun. 3, 2014, http://www.danielwireless.com/vnta/.
Reza Azimi, Gaurav Bhatia, Ragunathan (RAJ) Rajkumar, Priyantha Mudalige, "Vehicular Networks for Collision Avoidance at Intersections" Society for Automotive Engineers (SAE) World Congress, Apr. 2011, Detroit, MI, USA.
Danda B. Rawat, Dimitrie C. Popescu, Gongjun Yan, Stephan Olariu, "Enhancing VANET Performance by joint Adaptation of Transmission Power and Contention Window Size", IEEE Transaction on Parallel and Distributed Systems, vol. 22, No. 9, pp. 1528-1535, Sep. 2011.
Stephan Eichler, Benedikt Ostermaier, Christopher Schroth, Timo Kosch, "Simulation of Car-to-Car Messaging: Analyzing the Impact on the Road Traffic", IEEE Computer Society, 2005; 13th Annual Meeting of the IEEE International Symposium on Modeling, Analysis, and Simulation of Computer and Telecommunications Systems (MASCOTS).
J. Gonzalvez, M. Sepulcre, R. Bauza, "IEEE 802.11p Vehicle to Infrastructure Communications in Urban Environments" IEEE Communications Magazine, vol. 50, No. 5, pp. 176-183, May 2012.
James R. Milne, Gregory Peter Carlsson, Frederick J. Zustak, "Applying Mesh Network to Pet Carriers", related U.S. Appl. No. 14/333,006, Final Office Action dated Oct. 28, 2015.
James R. Milne, Gregory Peter Carlsson, Frederick J. Zustak, "Applying Mesh Network to Pet Carrier", applicants response to final office action filed Oct. 28, 2015 in related pending U.S. Appl. No. 14/333,006.
James R. Milne, Gregory Peter Carlsson, Frederick J. Zustak, "Applying Mesh Network to Pet Carrier", non-final office action dated Dec. 4, 2015 in related pending U.S. Appl. No. 14/333,006.
James R. Milne, Gregory Peter Carlsson, Frederick J. Zustak, "Applying Mesh Network to Pet Carrier", applicants response to non-final office action filed Dec. 10, 2015 in related pending U.S. Appl. No. 14/333,006.
Charles McCoy, James R. Milne, True Xiong, "Portable Device to Portable Device Wireless Power Transfer Methods and Systems" , related pending U.S. Appl. No. 14/290,409, non-final office action dated Apr. 19, 2016.
James P. Milne, Gregory Peter Carlsson, Frederick J. Zustak, "Applying Mesh Network to Pet Carriers", related U.S. Appl. No. 14/333,066, Applicant's response to Final Office Action filed Oct. 28, 2015.
James R. Milne, Gregory Peter Carlsson, Frederick J. Zustak, "Applying Mesh Network to Pet Carriers", related U.S. Appl. No. 14/333,006, Final Office Action dated Feb. 22, 2016.
James R. Milne, Gregory Peter Carlsson, Frederick J. Zustak, "Applying Mesh Network to Pet Carriers", related U.S. Appl. No. 14/333,006, Applicant's response to Final Office Action filed Mar. 16, 2016.
James R. Milne, Gregory Peter Carlsson, Frederick J. Zustak, "Applying Mesh Network to Luggage", related U.S. Appl. No. 14/332,919, Applicant's response to Final Office Action filed Jun. 14, 2016.
Gregory Peter Carlsson, Frederick J. Zustak, James R. Milne, "Mesh Network Applied to Arena Events", related U.S. Appl. No. 14/332,953, Non-Final Office Action dated Jun. 30, 2016.

Gregory Peter Carlsson, Frederick J. Zustak, James R. Milne, "Mesh Network Applied to Arena Events", related U.S. Appl. No. 14/332,953, Applicant's response to Non-Final Office Action filed Jun. 30, 2016.
James R. Milne, Gregory Peter Calrsson, Frederick J. Zustak, "Vehicle Ad Hoc Network (VANET)", related U.S. Appl. No. 14/332,900, Non-Final Office Action dated Jan. 14, 2016.
James R. Milne, Gregory Peter Calrsson, Frederick J. Zustak, "Vehicle Ad Hoc Network (VANET)", related U.S. Appl. No. 14/332,900, Applicant's response to Non-Final Office Action filed Jan. 15, 2016.
James R. Milne, Gregory Peter Carlsson, Frederick J. Zustak, "Applying Mesh Network to Luggage", related pending U.S. Appl. No. 14/332,919, non-final office action dated Jan. 20, 2016.
James R. Milne, Gregory Peter Carlsson, Frederick J. Zustak, "Applying Mesh Network to Luggage", related pending U.S. Appl. No. 14/332,919, filed Jul. 16, 2014.
James R. Milne, Gregory Peter Carlsson, Frederick J. Zustak, "Applying Mesh Network to Pet Carrier", related pending U.S. Appl. No. 14/333,006, filed Jul. 16, 2014.
James R. Milne, Gregory Peter Carlsson, Frederick J. Zustak, "Applying Mesh Network to Stadium Services", related pending U.S. Appl. No. 14/332,849, filed Jul. 16, 2014.
James R. Milne, Gregory Peter Carlsson, Frederick J. Zustak, "Vehicle AD Hoc Network (VANET)", related pending U.S. Appl. No. 14/332,900, filed Jul. 16, 2014.
Gregory Peter Carlsson, Frederick J. Zustak, James R. Milne,"Mesh Network Applied to Arena Events", related pending U.S. Appl. No. 14/332,953, filed Jul. 16, 2014.
James R. Milne, Gregory Peter Carlsson, Frederick J. Zustak, "Applying Mesh Network to Luggage", related U.S. Appl. No. 14/332,919, Applicant's response to Non-Final Office Action filed Feb. 11, 2016.
James R. Milne, Gregory Peter Carlsson, Frederick J. Zustak, "Vehicle Ad Hoc Network (VANET)", related pending U.S. Appl. No. 15/149,562, filed May 9, 2016.
James R. Milne, Gregory Peter Carlsson, Frederick J. Zustak, "Applying Mesh Network to Luggage", related U.S. Appl. No. 14/332,919, Final Office Action dated Jun. 3, 2016.
James R. Milne, Gregory Peter Carlsson, Frederick J. Zustak, "Applying Mesh Network to Pet Carriers", related U.S. Appl. No. 14/333,006. Non-Final Office Action dated Aug. 27, 2015.
James R. Milne, Gregory Peter Carlsson, Frederick J. Zustak, "Applying Mesh Network to Pet Carriers", related U.S. Appl. No. 14/333,006, Applicant's response to Non-Final Office Action filed Aug. 31, 2015.
James R. Milne, Gregory Peter Carlsson, Frederick J. Zustak, "Applying Mesh Network to Pet Carriers", related U.S. Appl. No. 14/333,006, Examiner's Answer dated Oct. 19, 2016.
James R. Milne, Gregory Peter Carlsson, Frederick J. Zustak, "Applying Mesh Network to Pet Carriers", related U.S. Appl. No. 14/333,006, Reply Brief filed Oct. 21, 2016.
James R. Milne, Gergory Peter Carlsson, Frederick J. Zustak, "Applying Mesh Network to Pet Carriers", related pending U.S. Appl. No. 14/333,006, Decision on Appeal reversed dated Dec. 6, 2017.
James R. Milne, Charles McCoy, True Xiong, "Scalable Antenna System", related U.S. Appl. No. 14/290,426, Non-Final Office Action dated Jul. 19, 2017.
James R. Milne, Gregory Peter Carlson, Frederick J. Zustak, "Applying Mesh Network to Stadium Services", related U.S. Appl. No. 14/332,849, Final Office Action dated Aug. 11, 2017.
James R. Milne, Gregory Peter Carlson, Frederick J. Zustak, "Applying Mesh Network to Stadium Services", related U.S. Appl. No. 14/332,849, Applicant's response to Final Office Action filed Aug. 17, 2017.
James R. Milne, Gregory Peter Carlsson, Frederick J. Zustak, "Applying Mesh Network to Stadium Services", related pending U.S. Appl. No. 14/332,849, applicant's response to final office action fled Jul. 17, 2017.
James R. Milne, Charles McCoy, True Xiong, "Scalable Antenna System", related U.S. Appl. No. 14/290,426, Non-Final Office Action dated Jun. 26, 2018.

(56) References Cited

OTHER PUBLICATIONS

Charles McCoy, James R. Milne, Tru Xiong, "Method and System for Use in Configuring Multiple Near Field Antenna Systems", related pending U.S. Appl. No. 14/460,224, non-final office action dated Apr. 19, 2017.

James R. Milne, Gregory Peter Carlsson, Frederick J. Zustak, "Applying Mesh Network to Stadium Services", related U.S. Appl. No. 14/332,849, Non-Final Office Action dated Jun. 19, 2017.

"New app looks to give smartphone owners the ability to text without service or Internet", Published Apr. 3, 2014, Associated Press.

* cited by examiner

MESH NETWORK APPLIED TO FIXED ESTABLISHMENT WITH MOVABLE ITEMS THEREIN

FIELD OF THE INVENTION

The application relates generally to mesh networks applied to fixed establishments with movable items therein.

BACKGROUND OF THE INVENTION

A mesh network is a type of computer ecosystem characterized by its sustainability, self-organization, and scalability. Each mesh node relays network data flowing to the node, and the nodes cooperate to appropriately distribute the data in the network. Typically, mesh networks are relatively short range networks, i.e., with node-to-node link distances of 250 meters or less, although a mesh network may use a gateway to connect to a wide area network such as the Internet.

Because mesh networks typically are wireless, they are ad hoc, meaning that nodes easily join and leave the network. As but one example, mesh networks can be spontaneously organized by the wireless computing devices establishing the nodes using Zigbee. Other example non-limiting mesh network protocols/systems can be based on Wi-Fi IEEE 802.11p, IEEE 802.11s, WAVE IEEE 1609, WiMAX IEEE 802.16, Bluetooth, and IRA.

When the wireless nodes of a mesh network move as the network operates, the network is sometimes referred to as a mobile ad hoc network (MANET) which continuously self-configures as nodes move into network range and out of network range. For this reason, nodal links in MANETs change frequently. MANETs may operate independently but may also use one or more of the nodes as a gateway to other MANETs and other networks such as the Internet.

Of relevance to this application is the application of mesh/MANET principles to fixed establishments with movable items therein.

SUMMARY OF THE INVENTION

As understood herein, fixed establishments such as factory floors, grocery stores, etc. have the need to run as efficiently as possible. But often the information tracked is not done in real-time. Present principles apply mesh network principles with and having a database collecting sensor data from the establishment to track and respond to the data in near real-time.

Accordingly, a system includes a mesh network dynamically established among first computerized node modules operatively engaged with respective movable items in a building. At least some of the first computerized node modules communicate at least respective location information among each other. At least one monitoring computer receives location information from at least the first computerized node modules via at least one access point (AP) communicating with at least one of the first computerized node modules.

In some examples second computerized node modules are operatively engaged with immovable items in the building and at least one first computerized node module communicating with at least one second computerized node module.

In example implementations the first computerized node modules (FCNM) are located in a store, and the respective movable items communicate with a node module operatively engaged with a shopping cart in which the FCNM are located. The node module operatively engaged with a shopping cart in which the FCNM are located communicates item data from the movable items in the shopping cart to a checkout station node module. The item data can include item type. A computer adds prices for the movable items in the shopping cart and presents a sum representative thereof on an example display. The example display presents a "yes" selector selectable to agree to pay the sum and a "no" selector selectable to decline to pay the sum. The example display may be a display of a consumer electronics (CE) device of a shopper which downloads an application from a store computer and provides its network address to the store computer and updates the store computer with its location information. The store computer may correlate CE device location with a shopping cart based on the CE device location being closest to a particular shopping cart than it is to other shopping carts.

In other examples the first computerized node modules (FCNM) are located in a factory.

In another aspect, a device includes a display, a computer readable storage medium bearing instructions executable by a processor, and a processor configured for accessing the computer readable storage medium to execute the instructions to configure the processor to present on the display a user interface (UI) populated with information from a store computer including total price of items in a shopping container automatically uploaded to the store computer from mesh network nodes associated with the items. The UI includes a prompt selectable to agree to pay the total price.

In another aspect, a non-transitory computer readable storage medium (NTCRSM) bears instructions executable by a processor to configure the processor to present on a display a user interface (UI) populated with information from a store computer including total price of items in a shopping container automatically uploaded to the store computer from mesh network nodes associated with the items. The UI includes a prompt selectable to agree to pay the total price.

The details of the present invention, both as to its structure and operation, can be best understood in reference to the accompanying drawings, in which like reference numerals refer to like parts, and in which:

DETAILED DESCRIPTION

Figure 1:
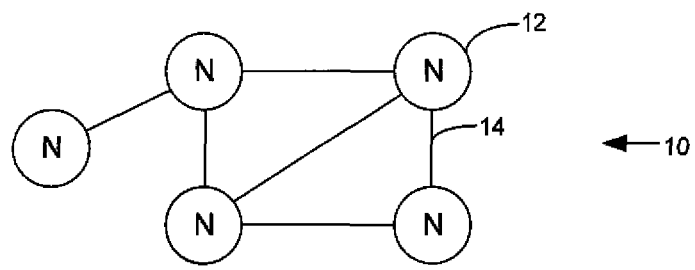
FIG. 1 is a block diagram of an example system including an example in accordance with present principles.

This disclosure relates generally to computer ecosystems and in particular to mesh networks and MANETs. A system herein may include server and client components that establish mesh network nodes, connected over a network such that data may be exchanged between the client and server components, although mesh networks may not include servers. The nodes may include one or more computing devices including portable televisions (e.g. smart TVs, Internet-enabled TVs), portable computers such as laptops and tablet computers, and other mobile devices including smart phones, mesh node modules that can be attached to moving objects, and additional examples discussed below. These devices may operate with a variety of operating environments. For example, some of the devices may employ, as examples, operating systems from Microsoft, or a Unix operating system, or operating systems produced by Apple Computer or Google.

Nodes, however implemented, may include one or more processors executing instructions that configure the node to receive and transmit data over a mesh network such as a MANET. A device such as a server may be instantiated by a game console such as a Sony Playstation (trademarked), a personal computer, etc.

Information may be exchanged over a network between network nodes. To this end and for security, nodes can include firewalls, load balancers, temporary storages, and proxies, and other network infrastructure for reliability and security. One or more nodes may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example mesh network 10 is shown, which may include one or more of the example devices mentioned above and described further below in accordance with present principles. These devices establish respective nodes 12 of the mesh network 10. The nodes 12 can spontaneously join and leave the network 10 as mentioned above, and when a node is a member of the network 10, it communicates with at least some of the other nodes 12 via wireless links 14. The nodes 12 may all be connected to every other node, or more typically are connected only to one or more of the other nodes, forwarding data through the network using "hop" principles and other relevant mesh protocol principles.

The nodes 12 may all be mobile nodes and may communicate only within the network 10, and not outside the network 10. More typically, at least one of the nodes 12 is a router or other gateway device that interfaces the mesh network 10 with other networks, such as the Internet. In some embodiments, one or more of the nodes 12 may be a fixed node, e.g., a gateway router or a server whose location does not change after installation or changes only infrequently, with the remaining node(s) 12 being mobile, while in some embodiments all of the nodes 12 may be fixed nodes.

In any case, the node 12 dynamically establish a mesh network, typically through one or more of the short-range transmitters described below. Each node typically is associated with a unique identification such as a media access control (MAC) address, and the MAC address may be correlated within the node (e.g., at time of manufacture or by a user at time of association with a particular component) or within a network server receiving information from the node with an identification of the component with which the MAC address is associated. For example, a nodal module may be associated with a vehicle, a person, an animal, a bicycle, a piece of luggage or a pet kennel, a particular stadium seat, an item in a factory or store, a user's CE device, etc., and the MAC address of that node may be correlated with the component accordingly. Consequently, when a mesh network is established and at least one of the network nodes uploads information gathered from the other nodes, that information may include (or be correlated at a server to) a type of component, so that a network map or other network information user interface (UI) may be presented showing the mesh nodes along with an identification of the components, and not just the MAC addresses, with which the nodes are associated.

Figure 2:
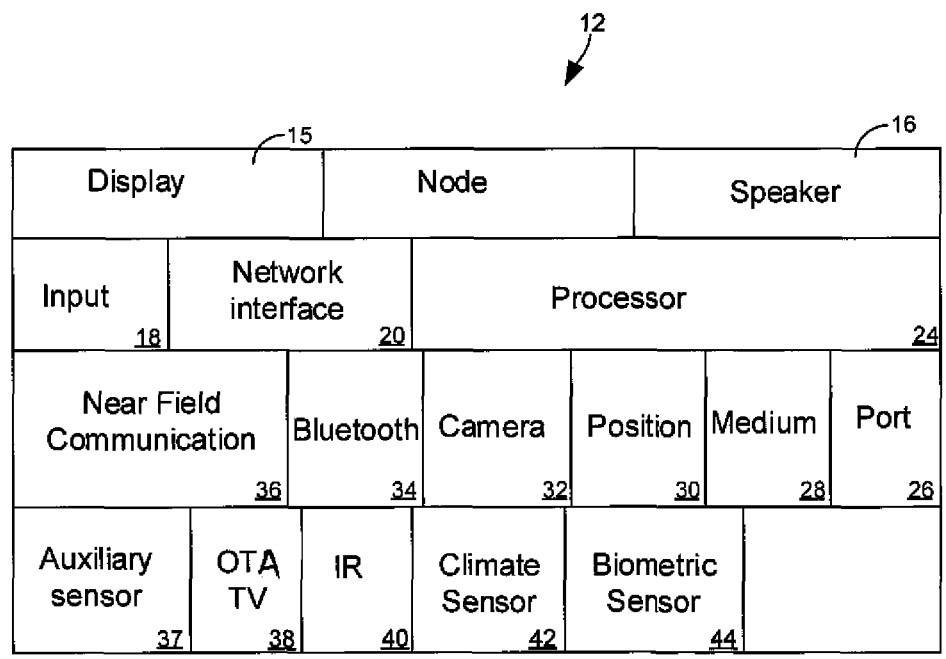
FIG. 2 is a schematic diagram of an example node.

FIG. 2 shows that an example node 12 can (but not must) include one or more displays 15 that may be implemented by a high definition or ultra-high definition "4K" or higher flat screen and that may be touch-enabled for receiving user input signals via touches on the display. The node 12 may include one or more speakers 16 for outputting audio in accordance with present principles, and at least one additional input device 18 such as e.g. an audio receiver/microphone for e.g. entering audible commands to the node 12 to control the node 12. The example node 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the node 12 to undertake present principles, including the other elements of the node 12 described herein such as e.g. controlling the display 15 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the node 12 may also include one or more input ports 26 such as, e.g., a high definition multimedia interface (HDMI) port or a USB port to physically connect (e.g. using a wired connection) to another CE device and/or a headphone port to connect headphones to the node 12 for presentation of audio from the node 12 to a user through the headphones. For example, the input port 26 may be connected via wire or wirelessly to a cable or satellite source of audio video content. Thus, the source may be, e.g., a set top box, or a satellite receiver, or a game console or disk player.

The node 12 may further include one or more tangible computer readable storage medium 28 such as disk-based or solid state storage. The data storage may contain the identification and price, for example, of an item on which it is to be applied or engaged. Also in some embodiments, the node 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the node 12 is disposed in conjunction with the processor 24. However, it is to be understood that that another suitable position receiver other than a cellphone receiver, GPS receiver and/or altimeter may be used in accordance with present principles to e.g. determine the location of the node 12 in e.g. all three dimensions.

Continuing the description of the node 12, in some embodiments the NODE 12 may include one or more cameras 32 that may be, e.g., a thermal imaging camera, a digital camera such as a webcam, and/or a camera integrated into the node 12 and controllable by the processor 24 to gather pictures/images and/or video in accordance with present principles. Also included on the node 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the node 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), other type of proximity sensor such as a camera executing image recognition to determine a particular object is close, etc.) providing input to the processor 24. The node 12 may include an over-the-air TV broadcast port 38 for receiving OTA TV broadcasts providing input to the processor 24. In addition to the foregoing, it is noted that the node 12 may also include an infrared (IR) transmitter and/or IR receiver and/or IR transceiver 40 such as an IR data association (IRDA) device. A battery (not shown) may be provided for powering the node 12.

The node 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Figure 3:
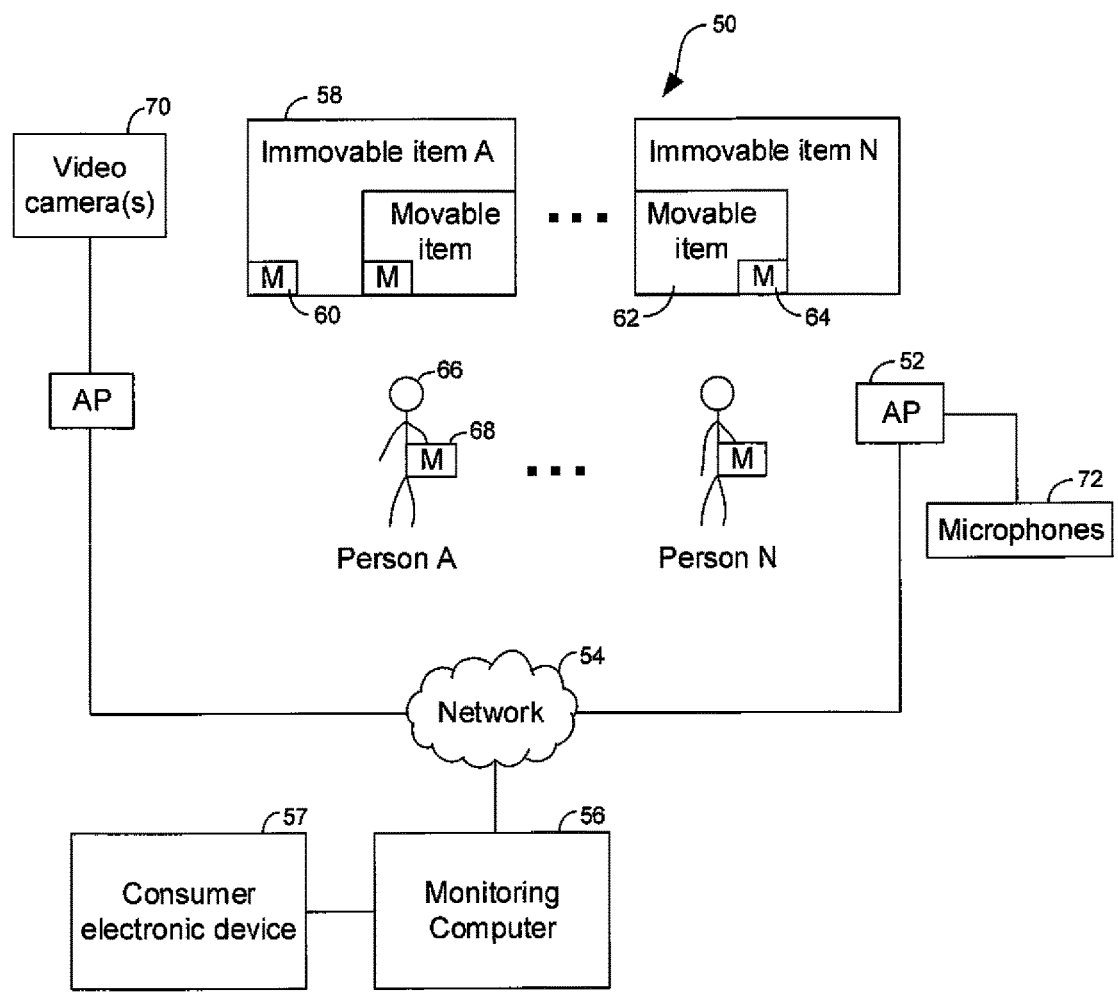
FIG. 3 is a schematic diagram of an example mesh network.

FIG. 3 shows an example mesh network 50 that includes plural node modules, each of which may include one or more of the node 12 components shown in FIG. 2, and which communicate using mesh network principles, such that messages may be relayed from node to node until one or more nodes is close enough to an access point 52 to communicate, via the access point 52, with a receiving network 54 such as the Internet or a corporate intranet having one or more central monitoring/control/management computers 56 which may include appropriate components of a node 12 in FIG. 2. The computers 56 may be, for example, desktop or other similar computers in the establishment for use by employees of the establishment. Portable communication computer electronic devices 57 such as smart phones that are held by occupants/shoppers in the establishment may also communicate with the store computer. The CE devices may include appropriate components of a node 12 in FIG. 2.

In the example shown, the nodes can include immovable items 58 with respective node modules 60, and movable items 62 with respective node modules 64. People 66 within the establishment housing the mesh network 50 may also wear respective node modules 68 on their persons, with the node modules 60, 64, 68 communicating with each other according to mesh network principles.

In some embodiments, the mesh network 50 is in a building such as a factory, the immovable items 58 are shelves or machines, and the movable items are work pieces or finished products. In other embodiments the mesh network is in a grocery store or other vending establishment, the immovable items are shelves or display cases, and the movable items 62 are items to be purchased, e.g., groceries or dry goods. These are but two example embodiments of establishments in which the mesh network 50 may be installed.

In such bounded environment, by means of the mesh network 50 it is possible to identify or predict optimal resource allocation for varying conditions and circumstances. For example, assume it is determined that there are four or five customers waiting in each line at the grocery store, based on their respective modules 68. Based on this information, more cashiers can automatically be dispatched to help decrease waiting time, thus providing better customer service.

Preferably, the mesh network 50 includes node modules engaged with all possible items in a particular environment. For example, in a factory, meshed sensor networks can be placed on every stationary and mobile items, including people (wearable technology). The mesh network can include audio and video feeds as well from video camera(s) 70 and microphone(s) 72 communicating with the monitoring computer 56, e.g., via APs 52. Just-in-time inventory is thus maintained of all items arriving using position signals from their respective node modules, as well as those items in process. Defective parts including why they failed and where they failed based on sensor data from their respective node modules also may be tracked, with this information being used to ensure there are replacement parts available or dispatch someone to repair the defect.

In the grocery store context, each stock item may include its own node module 64, and each cart may likewise include its own node module, in effect being a master node to the node of the items in the cart in a sub-mesh network. A fixed node module 62 at a checkout station can communicate with the node module of the cart, which receives items information from the node modules 64 of the items in the cart, and automatically produce an item list and pricing for payment. A customer may then swipe an electronic payment card at the checkout station to pay for the items without unloading the items from the cart, since all the items in a particular cart are network meshed together and report directly (through the cart node module) to the store's database network. Thus no cashier is required, just a checkout station to pay via credit card. This maintains checkout lines to an absolute minimum, making the store very efficient.

Figure 4:
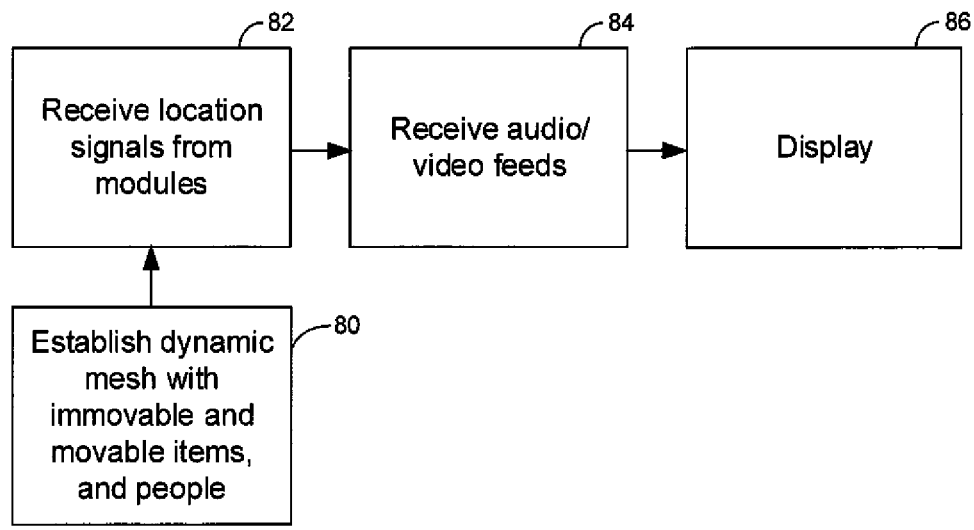
FIGS. 4 and 5 are flow charts of example non-limiting logic.
Figure 5:
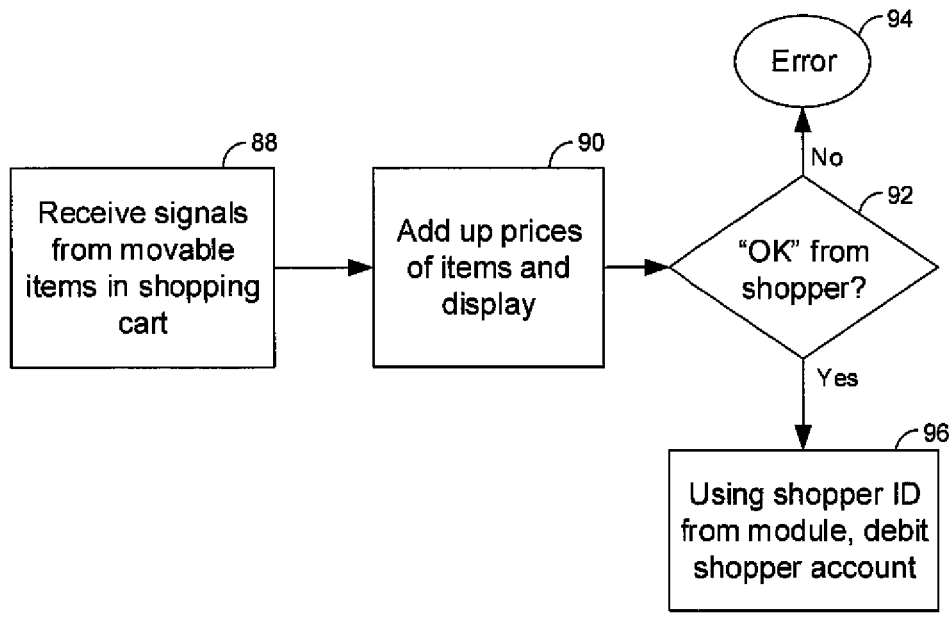

FIGS. 4 and 5 illustrate example logic. At block 80 the mesh network 50 is dynamically established among the nodes shown in FIG. 3 according to mesh network principles. The nodes of the network can include immovable items, movable (typically meaning portable or movable by a human without aid of machinery) items, and people.

Proceeding to block 82, location signals may be received at, e.g., the monitoring computer 56 from the nodes in the network 50 as such information is relayed among the nodes and eventually through an AP 52. Also, audio and video feeds may be received at block 84 from the cameras 70 and microphone 72, and audio video information displayed at block 86.

FIG. 5 illustrates a use case discussed above in which at block 88 signals are received from movable items in a shopping cart by, e.g., a checkout station node module as relayed by a shopping cart node module. The signals can indicate item types and if desired prices, although the signals may indicate only item types, with a store computer looking up prices for the types once the types are reported. In any case, at block 90 the prices for the items are added together and presented on a display of a CE device of the customer. The CE device can, for example, download an application from the store computer 56 automatically upon entering the store, during which process the CE device can provide its network address to the store computer and update the store computer with its location information. The store computer in turn can correlate the CE device location with a shopping cart based on the CE device location being closest to a particular shopping cart than it is to other shopping carts, so that when the shopping cart is present at a check out station, the store computer knows which CE device network address to communicate with.

Accordingly, a UI can be populated with information from a store computer including total price and presented on the CE device of the shopper. An amount to pay prompt (whether the shopper agrees to pay) may be presented on the CE device. Responsive to a "no" response from the CE device at decision diamond 92, an error is returned at state 94. Responsive to a "yes" response from the CE device at decision diamond 92, using the shopper ID from, e.g., the CE device or the shopper's electronic payment card or other shopper-associated device, an account of the shopper is debited for the total amount of the items at block 96.

Figure 6:
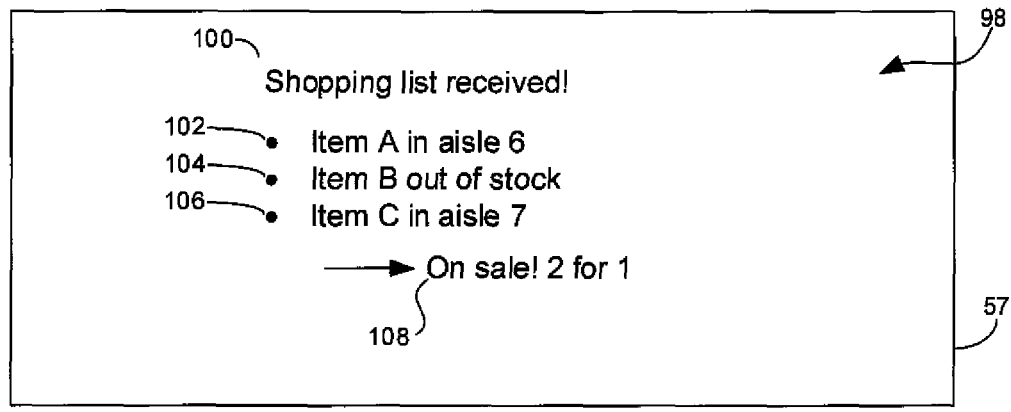
FIGS. 6 and 7 are screen shots of example user interfaces.

FIG. 6 illustrates a user interface (UI) 98 that can be presented on a display such as the display 15 when incorporated into a shopper CE device 57. In the example shown, the shopper, using his CE device 57, has uploaded, e.g., using the application discussed above which may be downloaded when the shopper enters the store, a shopping list of items desired by the shopper to purchase. A message 100 may be presented indicating the shopping list is received by the store. Various location messages may then be presented. For example, a message 102 can be presented indicating a location within the store of an item on the list, while another message 104 may be presented indicating that an item on the list is out of stock. The messages may be generated by the store computer after receiving the shopper's list by comparing items on the list to a database of items and their locations and stock status. These locations may be entered automatically into the store computer through the mesh network 50 as the various node modules 64 of movable items 62 report their locations in the store. An item on the list that the database indicates has not reported a location in the store may be inferred to be out of stock.

A message 106 can be presented indicating a location within the store of an item on the list, and a sub-message 108 may indicate that the item which is the subject of the message 106 is on sale.

Figure 7:
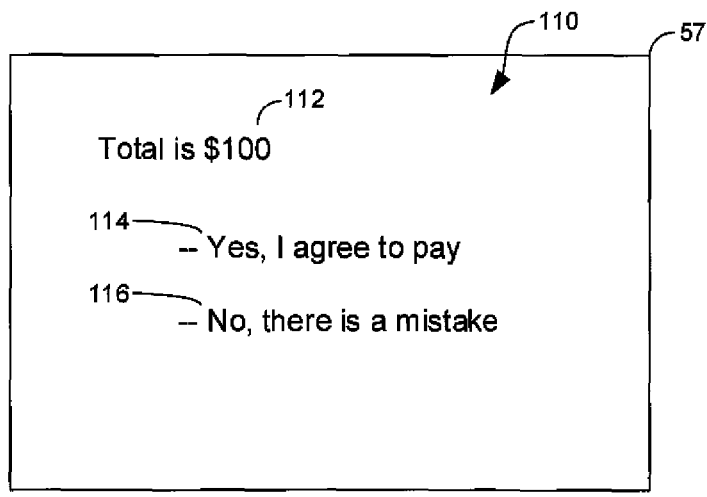

FIG. 7 shows a UI 110 that may be presented on the CE device of the shopper as discussed above. As shown, the UI 110 presents a total price 112. The shopper may select "yes" 114 to agree to pay the total price, in which case the shopper's account may be debited as described, or the shopper may select "no" 116 to refuse to pay the total amount.

It will be appreciated that while the MESH NETWORK APPLIED TO FIXED ESTABLISHMENT WITH MOVABLE ITEMS THEREIN has been fully described in relation to one or more example embodiments, these are not intended to be limiting, and that various alternative arrangements may be used to implement the subject matter claimed herein.

What is claimed is:

1. System comprising:
    a mesh network dynamically established among first computerized node modules operatively engaged with respective movable objects in a building, at least some of the first computerized node modules communicating at least respective location information among each other;
    at least some of the movable objects being goods associated with respective customers;
    at least one monitoring computer adapted for receiving location information from at least the first computerized node modules of respective goods via at least one access point (AP) communicating with at least one of the first computerized node modules, the AP being on a mobile container configured for holding the goods; and
    at least one consumer electronics (CE) device adapted with program instructions to download an application from the monitoring computer automatically, the CE device executing the application to provide its network address to the monitoring computer and to update the monitoring computer with location information of the CE device, the monitoring computer, based on the location information received from the CE device according to the application, correlating the CE device location with the container based on the CE device location being closest to the container than it is to other containers, the monitoring computer communicating with a CE device network address based on identifying that the container is present at a check-out station.

2. The system of claim 1, comprising second computerized node modules operatively engaged with immovable items in the building and at least one first computerized node module communicating with at least one second computerized node module.

3. The system of claim 1, wherein the first computerized node modules (FCNM) are located in a store, and respective movable items communicate with a node module operatively engaged with a mobile container in which the FCNM are located.

4. The system of claim 3, wherein the node module operatively engaged with a mobile container in which the FCNM are located is adapted with program instructions to communicate item data from the movable items in the mobile container to a checkout station node module.

5. The system of claim 4, wherein the item data includes item type.

6. The system of claim 4, comprising a computer adapted with program instructions to add prices for the movable items in the mobile container and present a sum representative thereof on a display.

7. The system of claim 6, wherein the computer is adapted with program instructions to cause the display to present a "yes" selector selectable to agree to pay the sum and a "no" selector selectable to decline to pay the sum.

8. The system of 7, wherein the display is a display of the CE device.

9. The system of claim 1, wherein the first computerized node modules (FCNM) are located in a factory.

10. A method comprising:
  establishing a mesh network among first computerized node modules operatively engaged with respective movable objects in a building;
  at least some of the movable objects being customers and some of the movable objects being goods associated with respective customers;
  correlating location information of customers to location information of respective goods associated with the customers;
  receiving location information from at least the first computerized node modules associated with respective goods via at least one access point (AP) communicating with at least one of the first computerized node modules, the AP being on a container configured for holding the goods;
  downloading an application to at least one consumer electronics (CE) device automatically, the CE device executing the application to provide its network address to a monitoring computer and to update the monitoring computer with location information of the CE device, the monitoring computer, based on the location information received from the CE device according to the application, correlating the CE device location with the container based on the CE device location being closest to the container than it is to other containers, the monitoring computer communicating with a CE device network address based on identifying that the container is present at a check-out station.

11. The method of claim 10, wherein second computerized node modules are operatively engaged with immovable items in the building and at least one first computerized node module communicates with at least one second computerized node module.

12. The method of claim 10, wherein the first computerized node modules (FCNM) are located in a store, and the method comprises respective movable items communicating with a node module operatively engaged with a mobile container in which the FCNM are located.

13. The method of claim 12, wherein the node module operatively engaged with a mobile container in which the FCNM are located, and the method comprises communicating item data from the movable items in the mobile container to a checkout station node module.

14. The method of claim 13, wherein the item data includes item type.

15. The method of claim 13, comprising adding prices for the movable items in the mobile container and presenting a sum representative thereof on a display.

16. The method of claim 15, comprising causing the display to present a "yes" selector selectable to agree to pay the sum and a "no" selector selectable to decline to pay the sum.

* * * * *